US008811294B2

(12) United States Patent
Sheth et al.

(10) Patent No.: US 8,811,294 B2
(45) Date of Patent: Aug. 19, 2014

(54) APPARATUS AND METHODS FOR ESTABLISHING CLIENT-HOST ASSOCIATIONS WITHIN A WIRELESS NETWORK

(75) Inventors: Soham V. Sheth, San Diego, CA (US); Fawad Shaukat, San Diego, CA (US); Huey Trando, San Diego, CA (US); Judit Martinez Bauza, San Diego, CA (US); Krishnan Rajamani, San Diego, CA (US); Samir S. Soliman, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 862 days.

(21) Appl. No.: 12/098,025

(22) Filed: Apr. 4, 2008

(65) Prior Publication Data

US 2009/0252130 A1    Oct. 8, 2009

(51) Int. Cl.
*H04W 4/00*   (2009.01)
*H04W 72/04*   (2009.01)
*H04W 84/18*   (2009.01)
*H04W 8/00*   (2009.01)

(52) U.S. Cl.
CPC .............. *H04W 72/04* (2013.01); *H04W 84/18* (2013.01); *H04W 8/005* (2013.01)
USPC ........... 370/329; 370/310; 370/328; 370/400; 370/422

(58) Field of Classification Search
USPC .......................... 370/310, 328, 329, 400, 422; 455/422.1, 415, 435.1, 455; 709/201, 709/202, 203, 208, 209, 210, 211, 212, 213, 709/214, 215, 217, 218, 219
See application file for complete search history.

(56) References Cited

U.S. PATENT DOCUMENTS 4,791,554 A   12/1988   Hirota et al.
5,835,723 A   11/1998   Andrews et al.
(Continued)

FOREIGN PATENT DOCUMENTS

CN   1437355 A   8/2003
CN   1561609 A   1/2005
(Continued)

OTHER PUBLICATIONS

Dorot, V., et al., "An Explanatory Dictionary of Modern Computer Terms," 2nd Edition, bhv, Saint Petersburg, 2001, 'Program Product' on p. 339.

(Continued)

*Primary Examiner* — Ayaz Sheikh
*Assistant Examiner* — Blanche Wong
(74) *Attorney, Agent, or Firm* — Donald C. Kordich (57) ABSTRACT

In embodiments, a one-to-one association is established between a client and a host in a wireless network, such as a wireless local area network or a wireless personal communication network. The client may be a display device. The host may be a cellular telephone. Active association corresponds to the host exclusively using a shared resource of the client. When the association is solid, requests from other hosts to establish an active association are denied. When the association is fragile, such requests are granted. In the case of a semi-solid association, a request from another host to establish an active association causes the client to generate a query to the host currently owning the active association. If the host currently owning the association grants a release, a new active association is established between the requesting host and the client. Otherwise, the request from the other host is denied.

46 Claims, 5 Drawing Sheets

(56) References Cited

U.S. PATENT DOCUMENTS

| | | |
|---|---|---|
| 5,925,137 A | 7/1999 | Okanoue et al. |
| 6,049,549 A | 4/2000 | Ganz et al. |
| 6,195,680 B1 | 2/2001 | Goldszmidt et al. |
| 6,252,889 B1 | 6/2001 | Patki et al. |
| 6,424,626 B1 | 7/2002 | Kidambi et al. |
| 6,515,992 B1 | 2/2003 | Weston et al. |
| 6,594,699 B1 | 7/2003 | Sahai et al. |
| 6,608,841 B1 | 8/2003 | Koodli |
| 6,748,195 B1 | 6/2004 | Phillips |
| 6,760,772 B2 | 7/2004 | Zou et al. |
| 6,801,530 B1 | 10/2004 | Brandt et al. |
| 6,876,857 B1 | 4/2005 | Nee et al. |
| 6,917,976 B1 | 7/2005 | Slaughter et al. |
| 7,035,281 B1 | 4/2006 | Spearman et al. |
| 7,085,420 B2 | 8/2006 | Mehrotra |
| 7,324,462 B1 | 1/2008 | Page et al. |
| 7,328,021 B1 | 2/2008 | Satapathy |
| 7,333,464 B2 | 2/2008 | Yang et al. |
| 7,366,204 B2 | 4/2008 | Kang et al. |
| 7,477,659 B1 * | 1/2009 | Nee et al. ............... 370/468 |
| 7,519,470 B2 | 4/2009 | Brasche et al. |
| 7,529,823 B2 * | 5/2009 | Trufinescu et al. ........... 709/223 |
| 7,565,357 B2 | 7/2009 | Rao |
| 7,688,859 B2 | 3/2010 | Chen et al. |
| 7,696,980 B1 | 4/2010 | Piot et al. |
| 7,712,670 B2 | 5/2010 | Sauerwein, Jr. et al. |
| 7,716,385 B2 | 5/2010 | Saint-Hilaire et al. |
| 7,719,972 B2 * | 5/2010 | Yuan et al. ................ 370/230 |
| 7,720,096 B2 | 5/2010 | Klemets |
| 7,868,890 B2 | 1/2011 | Ludwin et al. |
| 7,881,315 B2 | 2/2011 | Haveson et al. |
| 7,929,475 B2 | 4/2011 | Simonson et al. |
| 8,001,384 B2 | 8/2011 | Yamamoto et al. |
| 8,102,849 B2 | 1/2012 | Martinez Bauza et al. |
| 8,157,168 B2 | 4/2012 | Sauerwein, Jr. et al. |
| 8,364,201 B1 | 1/2013 | Fujisaki |
| 8,406,961 B2 | 3/2013 | Pathak et al. |
| 8,437,347 B2 | 5/2013 | Casaccia et al. |
| 8,466,870 B2 | 6/2013 | Cohen et al. |
| 8,517,251 B2 | 8/2013 | Cohen et al. |
| 2002/0007494 A1 | 1/2002 | Hodge |
| 2003/0033417 A1 | 2/2003 | Zou et al. |
| 2003/0064752 A1 | 4/2003 | Adachi et al. |
| 2003/0110297 A1 | 6/2003 | Tabatabai et al. |
| 2003/0152098 A1 | 8/2003 | Zhu |
| 2003/0225737 A1 | 12/2003 | Mathews |
| 2004/0071169 A1 | 4/2004 | Abe et al. |
| 2004/0103282 A1 | 5/2004 | Meier et al. |
| 2004/0160967 A1 | 8/2004 | Fujita et al. |
| 2004/0214571 A1 | 10/2004 | Hong |
| 2005/0021810 A1 | 1/2005 | Umemura et al. |
| 2005/0044142 A1 | 2/2005 | Garrec et al. |
| 2005/0060750 A1 | 3/2005 | Oka et al. |
| 2005/0096086 A1 | 5/2005 | Singamsetty |
| 2005/0102699 A1 | 5/2005 | Kim et al. |
| 2005/0111361 A1 | 5/2005 | Hosein |
| 2005/0130611 A1 | 6/2005 | Lu et al. |
| 2005/0136990 A1 | 6/2005 | Hardacker et al. |
| 2005/0138193 A1 | 6/2005 | Encarnacion et al. |
| 2005/0144225 A1 | 6/2005 | Anderson et al. |
| 2005/0166241 A1 | 7/2005 | Kim et al. |
| 2005/0176429 A1 | 8/2005 | Lee et al. |
| 2005/0184993 A1 | 8/2005 | Ludwin et al. |
| 2005/0198663 A1 | 9/2005 | Chaney et al. |
| 2005/0266798 A1 | 12/2005 | Moloney et al. |
| 2006/0002320 A1 | 1/2006 | Costa-Requena et al. |
| 2006/0013182 A1 | 1/2006 | Balasubramanian et al. |
| 2006/0028398 A1 | 2/2006 | Willmore |
| 2006/0050640 A1 | 3/2006 | Jin et al. |
| 2006/0058003 A1 | 3/2006 | Lee |
| 2006/0069797 A1 | 3/2006 | Abdo et al. |
| 2006/0098593 A1 | 5/2006 | Edvardsen et al. |
| 2006/0101146 A1 | 5/2006 | Wang |
| 2006/0133414 A1 | 6/2006 | Luoma et al. |
| 2006/0136963 A1 | 6/2006 | Oh et al. |
| 2006/0187964 A1 | 8/2006 | Li et al. |
| 2006/0198448 A1 | 9/2006 | Aissi et al. |
| 2006/0199537 A1 | 9/2006 | Eisenbach |
| 2006/0202809 A1 | 9/2006 | Lane et al. |
| 2006/0209787 A1 | 9/2006 | Okuda |
| 2006/0218298 A1 | 9/2006 | Knapp et al. |
| 2006/0233191 A1 | 10/2006 | Pirzada |
| 2006/0256851 A1 | 11/2006 | Wang et al. |
| 2006/0268869 A1 | 11/2006 | Boers et al. |
| 2006/0270417 A1 | 11/2006 | Chi |
| 2006/0288008 A1 | 12/2006 | Bhattiprolu et al. |
| 2007/0004387 A1 | 1/2007 | Gadamsetty et al. |
| 2007/0008922 A1 | 1/2007 | Abhishek et al. |
| 2007/0016654 A1 | 1/2007 | Bowles et al. |
| 2007/0022195 A1 | 1/2007 | Kawano et al. |
| 2007/0037600 A1 | 2/2007 | Fukuda |
| 2007/0057865 A1 | 3/2007 | Song et al. |
| 2007/0057885 A1 | 3/2007 | Kurumisawa et al. |
| 2007/0061433 A1 | 3/2007 | Reynolds et al. |
| 2007/0104215 A1 | 5/2007 | Wang et al. |
| 2007/0126715 A1 | 6/2007 | Funamoto |
| 2007/0141984 A1 | 6/2007 | Kuehnel et al. |
| 2007/0141988 A1 | 6/2007 | Kuehnel et al. |
| 2007/0171910 A1 | 7/2007 | Kumar et al. |
| 2007/0182728 A1 | 8/2007 | Fujimori |
| 2007/0259662 A1 | 11/2007 | Lee et al. |
| 2007/0264988 A1 | 11/2007 | Wilson et al. |
| 2007/0264991 A1 | 11/2007 | Jones et al. |
| 2007/0274400 A1 | 11/2007 | Murai et al. |
| 2007/0291636 A1 | 12/2007 | Rajagopal et al. |
| 2007/0292135 A1 | 12/2007 | Guo et al. |
| 2008/0005348 A1 | 1/2008 | Kosiba et al. |
| 2008/0013658 A1 | 1/2008 | Lewis et al. |
| 2008/0018657 A1 | 1/2008 | Montag |
| 2008/0031210 A1 | 2/2008 | Abhishek et al. |
| 2008/0037506 A1 | 2/2008 | Dharmaraju et al. |
| 2008/0037785 A1 | 2/2008 | Gantman et al. |
| 2008/0045149 A1 | 2/2008 | Dharmaraju et al. |
| 2008/0046944 A1 | 2/2008 | Lee et al. |
| 2008/0109763 A1 | 5/2008 | Lee |
| 2008/0129879 A1 | 6/2008 | Shao et al. |
| 2008/0198848 A1 | 8/2008 | Yamagishi |
| 2008/0205394 A1 | 8/2008 | Deshpande et al. |
| 2008/0232402 A1 | 9/2008 | Higuchi et al. |
| 2008/0270532 A1 | 10/2008 | Billmaier et al. |
| 2008/0273485 A1 | 11/2008 | Tsigler et al. |
| 2008/0304408 A1 | 12/2008 | Kraemer et al. |
| 2008/0307349 A1 | 12/2008 | Wang et al. |
| 2008/0310391 A1 | 12/2008 | Schneidman et al. |
| 2009/0002263 A1 | 1/2009 | Pasetto |
| 2009/0013081 A1 | 1/2009 | Laroia et al. |
| 2009/0031035 A1 | 1/2009 | Dharmaraju et al. |
| 2009/0070404 A1 | 3/2009 | Mazzaferri |
| 2009/0089453 A1 | 4/2009 | Bohan et al. |
| 2009/0102838 A1 | 4/2009 | Bullard et al. |
| 2009/0109974 A1 | 4/2009 | Shetty et al. |
| 2009/0133122 A1 | 5/2009 | Koo et al. |
| 2009/0141692 A1 | 6/2009 | Kasslin et al. |
| 2009/0153737 A1 | 6/2009 | Glen |
| 2009/0162029 A1 | 6/2009 | Glen |
| 2009/0252130 A1 | 10/2009 | Sheth et al. |
| 2010/0027467 A1 | 2/2010 | Wu et al. |
| 2010/0073334 A1 | 3/2010 | Cohen et al. |
| 2010/0118200 A1 | 5/2010 | Gelman et al. |
| 2010/0123826 A1 | 5/2010 | Sagi |
| 2010/0134312 A1 | 6/2010 | Park et al. |
| 2010/0146143 A1 | 6/2010 | Thorup |
| 2010/0146583 A1 | 6/2010 | Prehofer et al. |
| 2010/0153553 A1 | 6/2010 | Sheth et al. |
| 2010/0166017 A1 | 7/2010 | Na et al. |
| 2010/0172320 A1 | 7/2010 | Suzuki |
| 2010/0189131 A1 | 7/2010 | Branam et al. |
| 2010/0199187 A1 | 8/2010 | Lin et al. |
| 2010/0205321 A1 | 8/2010 | Martinez Bauza et al. |
| 2010/0257450 A1 | 10/2010 | Go et al. |
| 2010/0281103 A1 | 11/2010 | Imai et al. |
| 2010/0289871 A1 | 11/2010 | Tatsuta et al. |
| 2010/0289872 A1 | 11/2010 | Funabiki et al. |
| 2011/0002255 A1 | 1/2011 | Dharmaraju et al. |

(56) References Cited

U.S. PATENT DOCUMENTS

| | | |
|---|---|---|
| 2011/0019620 A1 | 1/2011 | Wang |
| 2011/0037447 A1 | 2/2011 | Mair |
| 2011/0069720 A1 | 3/2011 | Jacobs et al. |
| 2011/0072473 A1 | 3/2011 | Funabiki et al. |
| 2011/0107388 A1 | 5/2011 | Lee et al. |
| 2011/0115818 A1 | 5/2011 | Chung et al. |
| 2011/0128442 A1 | 6/2011 | Blanchard et al. |
| 2011/0145879 A1 | 6/2011 | Rajamani et al. |
| 2011/0149806 A1 | 6/2011 | Verma et al. |
| 2011/0157470 A1 | 6/2011 | Tsuruga et al. |
| 2011/0182195 A1 | 7/2011 | Oikawa |
| 2011/0186138 A1 | 8/2011 | Hanna et al. |
| 2011/0205433 A1 | 8/2011 | Altmann |
| 2011/0216239 A1 | 9/2011 | Raveendran |
| 2011/0216785 A1 | 9/2011 | Begen et al. |
| 2011/0216829 A1 | 9/2011 | Raveendran |
| 2011/0281557 A1 | 11/2011 | Choi et al. |
| 2011/0314168 A1 | 12/2011 | Bathiche et al. |
| 2012/0036543 A1 | 2/2012 | George et al. |
| 2012/0036549 A1 | 2/2012 | Patel et al. |
| 2012/0044985 A1 | 2/2012 | Tao et al. |
| 2012/0113113 A1 | 5/2012 | Hong |
| 2013/0002949 A1 | 1/2013 | Raveendran et al. |
| 2013/0003621 A1 | 1/2013 | Huang et al. |
| 2013/0003622 A1 | 1/2013 | Huang et al. |
| 2013/0003623 A1 | 1/2013 | Raveendran et al. |
| 2013/0003624 A1 | 1/2013 | Huang et al. |
| 2013/0009873 A1 | 1/2013 | Huang et al. |
| 2013/0009887 A1 | 1/2013 | Huang et al. |
| 2013/0009996 A1 | 1/2013 | Raveendran et al. |
| 2013/0013318 A1 | 1/2013 | Huang et al. |
| 2013/0033435 A1 | 2/2013 | Raveendran et al. |
| 2013/0033496 A1 | 2/2013 | Raveendran et al. |
| 2013/0047189 A1 | 2/2013 | Raveendran et al. |
| 2013/0238702 A1 | 9/2013 | Sheth et al. |
| 2013/0246665 A1 | 9/2013 | Lee et al. |
| 2013/0272628 A1 | 10/2013 | Lee |

FOREIGN PATENT DOCUMENTS

| | | |
|---|---|---|
| CN | 1596004 A | 3/2005 |
| CN | 1774106 A | 5/2006 |
| CN | 1832481 A | 9/2006 |
| CN | 1983945 A | 6/2007 |
| CN | 101033825 A | 12/2007 |
| CN | 101247250 A | 8/2008 |
| EP | 1203080 A2 | 5/2002 |
| EP | 1203080 A2 | 5/2002 |
| EP | 1206080 A1 | 5/2002 |
| EP | 1206080 A1 | 5/2002 |
| EP | 1233326 A2 | 8/2002 |
| EP | 1233326 A2 | 8/2002 |
| EP | 1325591 A1 | 7/2003 |
| EP | 1333373 A1 | 8/2003 |
| EP | 1385336 A2 | 1/2004 |
| EP | 1423778 A2 | 6/2004 |
| EP | 1517228 A2 | 3/2005 |
| EP | 1517228 A2 | 3/2005 |
| EP | 1550264 A1 | 7/2005 |
| EP | 1653678 A2 | 5/2006 |
| EP | 1653678 A2 | 5/2006 |
| EP | 1944946 | 7/2008 |
| EP | 1959686 A2 | 8/2008 |
| EP | 2012461 | 1/2009 |
| EP | 2037683 | 3/2009 |
| EP | 2190202 A1 | 5/2010 |
| GB | 2383920 A | 7/2003 |
| JP | 2000278320 A | 10/2000 |
| JP | 2000354031 A | 12/2000 |
| JP | 2002165248 A | 6/2002 |
| JP | 2002165248 A | 6/2002 |
| JP | 2002262341 A | 9/2002 |
| JP | 2002262341 A | 9/2002 |
| JP | 2003143237 A | 5/2003 |
| JP | 2003143237 A | 5/2003 |
| JP | 2004054783 A | 2/2004 |
| JP | 2004505531 A | 2/2004 |
| JP | 2004505531 A | 2/2004 |
| JP | 2004192140 A | 7/2004 |
| JP | 2004274159 A | 9/2004 |
| JP | 2004531916 | 10/2004 |
| JP | 2005515714 A | 5/2005 |
| JP | 2005142808 A | 6/2005 |
| JP | 2005142808 A | 6/2005 |
| JP | 2005204016 A | 7/2005 |
| JP | 2006514353 A | 4/2006 |
| JP | 2006121562 A | 5/2006 |
| JP | 2006254328 A | 9/2006 |
| JP | 2007082070 A | 3/2007 |
| JP | 2007088539 A | 4/2007 |
| JP | 2007206644 A | 8/2007 |
| JP | 2007274150 A | 10/2007 |
| JP | 2007282219 A | 10/2007 |
| JP | 2008191929 A | 8/2008 |
| JP | 2008547264 A | 12/2008 |
| JP | 2008547264 A | 12/2008 |
| KR | 1020050007533 | 1/2005 |
| KR | 20060060717 A | 6/2006 |
| RU | 2207723 C1 | 6/2003 |
| RU | 2004110228 | 3/2005 |
| RU | 2005113275 A | 10/2005 |
| RU | 2269873 C2 | 2/2006 |
| TW | 496058 | 7/2002 |
| TW | 234954 | 6/2005 |
| TW | I234954 | 6/2005 |
| TW | 239179 | 9/2005 |
| TW | I239179 | 9/2005 |
| TW | 200618653 | 6/2006 |
| TW | 200838310 A | 9/2008 |
| TW | 200943168 A | 10/2009 |
| WO | 0184291 A1 | 11/2001 |
| WO | WO0184291 A1 | 11/2001 |
| WO | 0210942 | 2/2002 |
| WO | WO02010942 | 2/2002 |
| WO | 0223825 A1 | 3/2002 |
| WO | 0249314 A2 | 6/2002 |
| WO | WO0249314 A2 | 6/2002 |
| WO | 03023587 A2 | 3/2003 |
| WO | 03061240 A1 | 7/2003 |
| WO | WO-03104834 A2 | 12/2003 |
| WO | 2004034646 A1 | 4/2004 |
| WO | 2004051962 A1 | 6/2004 |
| WO | WO-2005107187 A1 | 11/2005 |
| WO | WO-2005109781 A1 | 11/2005 |
| WO | 05122509 | 12/2005 |
| WO | WO2005122509 | 12/2005 |
| WO | 2006135289 A1 | 12/2006 |
| WO | WO2006135289 A1 | 12/2006 |
| WO | 2007000757 | 1/2007 |
| WO | WO2007000757 | 1/2007 |
| WO | 2007021269 | 2/2007 |
| WO | WO2007021269 | 2/2007 |
| WO | WO-2007033049 A2 | 3/2007 |
| WO | 2008027724 A1 | 3/2008 |
| WO | 2008087713 A1 | 7/2008 |

OTHER PUBLICATIONS

Zhanping Yin et al: "Third-party handshake protocol for efficient peer discovery in IEEE 802.15.3 WPANs" Broadband Networks, 2005 2nd International Conference on Boston, MA Oct. 3-7, 2005, Piscataway, NJ, USA IEEE, October 3, 2005, pp. 902-911, XP010890303.

Media Content Distribution (MCD); 3D 1-30 Gaming Graphics Delivery Overview, Technical Report, European Telecommunications Standards Institute (ETSI), 650, Route Des Lucioles; F-06921 Sophia-Antipolis; France, vol. MCD, No. V1. 1. 1, Dec. 1, 2010, XP014061814, section 5.

Minai Mitrea et al: "Novel approaches to 1-30 remote display representations: BiFS-solution and its deployment within the FP7 MobiThin project", 87. MPEG Meeting; Feb. 2, 2009-Jun. 2, 2009; Lausanne; (Motion Picture Expert Group or ISO/IEC JTC1/SC29/

(56) References Cited

OTHER PUBLICATIONS

WG11),, No. M16058, Jan. 29, 2009, XP030044655, sections 2 and 3.
Apple, Safari Web Content Guide, Chapter 6, Handling Events, Oct. 12, 2011, retrieved from http://developer.apple.com/library/safari/#documentation/AppleApplications/Reference/SafariWebContent/HandlingEvents/HandlingEvents.html.
Basso et al., "RTP Payload Format for MPEG-4 Streams; draft-ietf-avt-mpeg4-multisi-03.txt", vol. avt, No. 3, Nov. 1, 2001, XP015015620, ISSN: 0000-0004.
Doerffel T., "User manual iTALC—Intelligent Teaching and Learning with Computers Version 1.0.4", Jan. 29, 2008, pp. 1-17, XP55025785, Retrieved from the Internet: URL:http://italc.sourceforge.net/italc-manual-2007-01-29.pdf [retrieved on Apr. 26, 2012] the whole document.
Dorot V., et al., "An Explanatory Dictionary of Modern Computer Terms," 2nd Edition, 2001, 'Program Product' on p. 339, BHV-Petersburg Publishers, Saint Petersburg.
Euihyeok Kwon, et al., "An idle timeslot reuse scheme for IEEE 802.15.3 high-rate wireless personal area networks" Vehicular Technology Conference, 2005. VTC-2005-Fall. 2005 IEEE 62nd Dallas, TX, USA Sep. 25-28, 2005, Piscataway, NJ, USA, IEEE, Sep. 25.
Helmy A: "Architectural framework for large-scale multicast in mobile ad hoc networks" Proceedings of IEEE International Conference on Communications—Apr. 28-May 2, 2002—New York, NY, USA, IEEE, Piscataway, NJ, USA LNKDDOI: 10.1109/ICC.2002.997206, vol. 4, Apr. 28, 2002, pp. 2036-2042, XP010589844 ISBN: 978-0-7803-7400-3.
IEEE 802.15.3, "Part 15.3: Wireless Medium Access Control (MAC) and Physical Layer (PHY) Specifications for High Rate Wireless Personal Area Networks (WPANs)," IEEE Computer Society, 2003.
International Preliminary Report on Patentability—PCT/US2010/023842—The International Bureau of WIPO—Geneva, Switzerland, Mar. 17, 2011.
International Search Report—PCT/US07/069813, International Search Authority—European Patent Office, Jan. 18, 2008, US2007.
International Search Report—PCT/US07/069815, International Search Authority—European Patent Office, Jul. 2, 2008, US2007.
International Search Report—PCT/US08/071147, International Search Authority—European Patent Office, Feb. 5, 2009, US2008/071147.
International Search Report and Written Opinion—PCT/US2010/060249, International Search Authority—European Patent Office—Mar. 8, 2011.
International Search Report and Written Opinion—PCT/US2012/022064—ISA/EPO—Jun. 25, 2012.
International Search Report and Written Opinion—PCT/US2012/022068—ISA/EPO—Jun. 22, 2012.
International Search Report and Written Opinion—PCT/US2012/022072—ISA/EPO—Jun. 22, 2012.
International Search Report and Written Opinion—PCT/US2012/022076—ISA/EPO—Jun. 22, 2012.
International Search Report and Written Opinion—PCT/US2012/022080—ISA/EPO—May 31, 2012.
International Search Report and Written Opinion—PCT/US2012/022087—ISA/EPO—Jul. 2, 2012.
International Search Report and Written Opinion—PCT/US2012/022090—ISA/EPO—May 31, 2012.
International Search Report and Written Opinion—PCT/US2012/023842—ISA/EPO—May 18, 2012.
International Search Report and Written Opinion—PCT/US2012/023848—ISA/EPO—May 15, 2012.
International Search Report and Written Opinion—PCT/US2012/023851—ISA/EPO—Aug. 28, 2012.
International Search Report and Written Opinion—PCT/US2010/023834, International Search Authority—European Patent Office—Jul. 12, 2010.
International Search Report and Written Opinion—PCT/US2010/023842, International Search Authority—European Patent Office—Jul. 13, 2010.
International Search Report and Written Opinion—PCT/US2010/040650—International Search Authority, European Patent Office,Nov. 16, 2010.
International Search Report—PCT/US2009/039564—International Search Authority—European Patent Office, Jul. 29, 2009.
International Search Report/Written Opinion—PCT/US09/067632—International Search Authority EPO—Apr. 29, 2010, US2009/067632.
McKnight et al. (TPRC 30th Research Conference on Communication, Information and Internet Policy, Aug. 2002) Virtual Markets in Wireless Grids: Peering Policy Obstacles, hereinafter referred as McKnight, pp. 1 and 20.
Media Content Distribution (MCD); 3D 1-30 Gaming Graphics Delivery Overview, Technical Report, European Telecommunications Standards Institute (EISI), 650, Route Des Lucioles ; F-06921 Sophia-Antipolis ; France, vol . MCD, No. V1. 1. 1, Dec. 1, 2010, XP014061814, section 5.
Mihai Mitrea et al: "Novel approaches to 1-30 remote display representations: BiFS-based solution and its deployment within the FP7 MobiThin project", 87. MPEG Meeting; Feb. 2, 2009-Jun. 2, 2009; Lausanne; (Motion Picture Expert Group or ISO/IEC JTC1/SC29/WG11),, No. M16058, Jan. 29, 2009, XP030044655, sections 2 and 3.
Miller B., et al., "Mapping salutation architecture APIs to Bluetooth service discovery layer," Bluetooth White Paper, [Online} pp. 1-25, Jul. 1, 1999, XP002511956.
MSDN DirectShow, retrieved Nov. 28, 2011 from: http://msdn.microsoft.com/en-us/library/dd375454(VS.85).aspx.
MSDN Windows Sockets 2, retrieved Nov. 28, 2011 from: http://msdn.microsoft.com/en-us/library/ms740673(VS.85).aspx.
Myers, et al: "Collaboration Using Multiple PDAS Connected to a PC," Proceedings of the ACM Conference on Computer Supported Cooperative Work (CSCW), Nov. 14, 1998, pp. 285-294, ISBN: 978-1-58113-009-6.
Nave I et al., "Games@large graphics streaming architecture", Consumer Electronics, 2008. ISCE 2008. IEEE International Symposium on, IEEE, Piscataway, NJ, USA, Apr. 14, 2008, pp. 1-4, XP031283619, ISBN: 978-1-4244-2422-1 abstract col. 2-col. 6.
Nordbotten, N.A. et al., "Methods for service discovery in Bluetooth scatternets," Computer Communications, Elsevier Science Publishers BV, Amdsterdam, NL, vol. 27, No. 11, Jul. 1, 2004, pp. 1087-1096, XP004503638.
Schulzrinne, et al., "RTP: A Transport Protocol for Real-Time Applications", rfc3550.txt, Jul. 1, 2003, XP015009332, ISSN: 0000-0003.
Shoji Y., et al., "Research and Standardization activty for IEEE802.15.3c mmW WPAN: (2) Target applications and Usage Models", IEICE Tech. Rep., vol. 106, No. 555, RCS2006-279, pp. 179-182, Feb. 2007.
Taiwan Search Report—TW097128564—TIPO—Nov. 22, 2011.
Taiwanese Search Report—096119014—TIPO—Jul. 31, 2010.
Wenger et al., "RTP Payload Format for H.264 Video," Network Working Group, RFC 3984, Feb. 2005, 78 pp.
Written Opinion—PCT/US08/071147, International Search Authority—European Patent Office, Feb. 5, 2009.
Written Opinion—PCT/US2007/069813, International Search Authority, European Patent Office, Jan. 18, 2008, US2008/071147.
Written Opinion—PCT/US2007/069815, International Search Authority, European Patent Office, Feb. 7, 2008.
Written Opinion—PCT/US2009/039564, International Search Authority, European Patent Office, Jul. 29, 2009.
Zhanping Yin et al: "Third-party handshake protocol for efficient peer discovery in IEEE 802.15.3 WPANs" Broadband Networks, 2005 2nd International Conference on Boston, MA Oct. 3-7, 2005, Piscataway, NJ, USA IEEE, Oct. 3, 2005, pp. 902-911, XP010890303.
Brandenburg, et al., AVTCore, RTCP for inter-destination media syncronization, Internet Draft, draft-ietf-avtcore-idms-092.txt, Oct. 31, 2011.
Co-pending U.S. Appl. No. 10/236,657, filed Sep. 6, 2002.
Taiwan Search Report—TW098111391—TIPO—Dec. 4, 2012.
Video Electronics Standards Association (VESA) Mobile Display Digital Interface Standard (MDDI), Jul. 2004.

(56) References Cited

OTHER PUBLICATIONS

Taiwan Search Report—TW096140444—TIPO—Sep. 16, 2013.
Casner, S., et al., "Compressing IP/UDP/RTP Headers for Low-Speed Serial Links," IETF Network Working Group, RFC 2508 (Feb. 1992).
Gentric., et al., "RTP Payload Format for MPEG-4 Streams", Internet Engineering Task Force, draft-ietf-avt-mpeg4-multisl-03.txt, Nov. 2001, pp. 13,14,25 and 33 . . .
Handley, M. et al., "SDP: Session Description Protocol" Network Working Group, Request for Comments: 2327, Category: Standards Track. ISI/LBNL, Apr. 1998, pp. 1-42.
"Bluetooth Specification Version 1.1" published Feb. 22, 2001; Section 1 pp. 41-42; Section 2.1, p. 43; Section 4.1-2, pp. 47-50; Section 10.9, p. 120; and Section 11, pp. 126-137.
Byungjoo Lee, Provisional U.S. Appl. No. 61/433,942, filed Jan. 18, 2011.
Taiwan Search Report—TW098111391—TIPO—Nov. 1, 2013.

* cited by examiner

APPARATUS AND METHODS FOR
ESTABLISHING CLIENT-HOST
ASSOCIATIONS WITHIN A WIRELESS
NETWORK

BACKGROUND

1. Field

The present invention relates generally to communications. More particularly, in aspects the invention relates to establishing and changing one-to-one client-host associations in a wireless network.

2. Background

Portability and functionality of wireless communication devices continue to improve, contributing to the proliferation of wireless communication networks. Many conventionally-wired connections are being replaced with wireless connections, including ad hoc connections made when one wireless device moves into the connectivity area of another wireless device. Of some interest are wireless local area networks (wireless LANs or WLANs), such as wireless networks under the various IEEE 802.11 standards. Of some interest are also wireless personal area networks (wireless PANs or WPANs), which are networks that are often used for communication between or among devices close to one person. The reach of WLANs and WPANs is typically of the order of ten meters, although some networks operate over distances three, ten, or even thirty times as long.

A wireless LAN or PAN network may be used for communications between or among personal devices, or for communications between such personal devices and higher level networks, including the Internet. A wireless network may be implemented using infrared data association (IrDA), Bluetooth, ultra-wide band (UWB), ZigBee, and the IEEE 802.11 standard technologies.

Wireless body area networks may be considered a subset of personal area networks. A wireless body area network may include wireless sensors for monitoring various body parameters and functions. The sensors may transmit real-time data to a base station located, for example, in a person's home.

Links between two wireless devices in a wireless network may be established for one-to-one communication between the two devices. One of the devices—the client—may provide over a link use of a resource exclusively to the other device—the host. An example of such a resource is a display device that can be operated wirelessly from a personal computer, personal digital assistant, or a cellular telephone with wireless capability in addition to cellular connectivity.

A need exists in the art for apparatus, methods, and articles of manufacture that facilitate establishing links in wireless networks, including wireless LANS and wireless PANs. A need also exists for apparatus, methods, and articles of manufacture that facilitate changing availability of resources from one host to another in wireless networks.

SUMMARY

Embodiments disclosed herein may address one or more of the above stated needs by providing apparatus, methods, and articles of manufacture for establishing one-to-one wireless network associations in different categories.

A method for providing use of a shared resource of a client over a wireless network is described. The method includes establishing a passive association between the client and a first host for communications over the wireless network. The passive association does not allow use of the shared resource by the first host. The method also includes receiving at the client a request from the first host to establish an active association allowing exclusive use of the shared resource by the first host. The request is received over the wireless network. The method further includes determining at the client whether an active association allowing exclusive use of the shared resource by a second host exists (i.e., whether any previously-established active association with any other host exists), which step is performed in response to the request from the first host. If there is no active association with the second (i.e., any other) host, the method further includes establishing the active association with the first host and allowing the first host exclusive use of the shared resource.

A wireless network client device is described. The client device includes a shared resource, a memory, a receiver of the wireless network, a transmitter of the wireless network, and a controller. The controller is coupled to the receiver, the transmitter, the shared resource, and the memory. The controller is configured to establish a passive association between the client device and a first host for communications over the wireless network. The passive association does not allow use of the shared resource by the first host. The controller is also configured to receive over the wireless network a request from the first host to establish an active association allowing exclusive use of the shared resource by the first host. The controller is further configured to determine, in response to the request from the first host, whether an active association allowing exclusive use of the shared resource by a second host exists. (That is, determine whether any previously-established active association with any other host exists.) If the active association allowing exclusive use of the shared resource by the second host does not exist, the controller is configured to establish the active association with the first host and allow the first host exclusive use of the shared resource.

A machine-readable medium storing instructions is described. When the instructions are executed by at least one processor of a client device having a shared resource and configured to receive and transmit over a wireless network, the instructions cause the client device to perform a number of steps. The steps include establishing a passive association between the client device and a first host for communications over the wireless network. The passive association does not allow use of the shared resource by the first host. The steps also include receiving over the wireless network a request from the first host to establish an active association allowing exclusive use of the shared resource by the first host. The steps further include determining, in response to the request from the first host, whether an active association allowing exclusive use of the shared resource by a second host exists. (That is, determining whether any previously-established active association with any other host exists.) If the step of determining whether an active association allowing exclusive use of the shared resource by the second host exists results in a determination that there is no active association with the second host, the steps further include establishing the active association with the first host and allowing the first host exclusive use of the shared resource.

Another client device is described having a shared resource means, a means for storing data, a means for receiving information over a wireless network, a means for transmitting information over the wireless network, and a controller means for controlling the shared resource means, the means for storing data, the means for receiving, and the means for transmitting. The controller means is configured to establish a passive association between the client device and a first host for communications over the wireless network. The passive association does not allow use of the shared resource means by the first host. The controller means is also configured to receive over the wireless network a request from the first host to establish an active association allowing exclusive use of the shared resource means by the first host. The controller means is further configured to determine, in response to the request from the first host, whether an active association allowing exclusive use of the shared resource means by any other host exists. If the active association allowing exclusive use of the shared resource means by any other host does not exist, the controller means is further configured to establish the active association with the first host and allow the first host exclusive use of the shared resource means.

These and other aspects of the present invention will be better understood with reference to the following description, drawings, and appended claims.

DETAILED DESCRIPTION

In this document, the words "embodiment," "variant," and similar expressions are used to refer to particular apparatus, process, or article of manufacture, and not necessarily to the same apparatus, process, or article of manufacture. Thus, "one embodiment" (or a similar expression) used in one place or context may refer to a particular apparatus, process, or article of manufacture; the same or a similar expression in a different place may refer to a different apparatus, process, or article of manufacture. The expressions "alternative embodiment," "alternatively," and similar phrases may be used to indicate one of a number of different possible embodiments. The number of possible embodiments is not necessarily limited to two or any other quantity.

The word "exemplary" may be used herein to mean "serving as an example, instance, or illustration." Any embodiment or variant described herein as "exemplary" is not necessarily to be construed as preferred or advantageous over other embodiments or variants. All of the embodiments and variants described in this description are exemplary embodiments and variants provided to enable persons skilled in the art to make and use the invention, and not necessarily to limit the scope of legal protection afforded the invention.

The word "association" relates to a communication link established between a client device where a resource resides and a host device that wishes to use the resource. The communication link may be over a wired or wireless medium. An "association" is a temporary relationship established between the corresponding application entities on the host and client devices, where either entity can initiate the association and negotiate the service parameters (quality of service, for example) and/or communication parameters. An "active" association is an association that provides for exclusive use of a shared resource residing at a client or otherwise available through the client. A "passive" association allows negotiation of communication (and possibly other) parameters, but does not provide for the use of the shared resource available at the client. Under a passive association, periodic monitoring messages may be passed between the host and the client (either uni-directionally or bi-directionally), so that the devices are aware of each other's presence within the communication distance of the wireless network; and communication parameters may be maintained or periodically changed depending on various circumstances, such as availability of power, computational resources, and presence of other hosts in the wireless network. Certain aspects of associations are described in a commonly-assigned U.S. provisional patent application Ser. No. 60/951,919, filed on Jul. 25, 2007, entitled Wireless Architecture for a Traditional Wire-Based Protocol.

Figure 1:
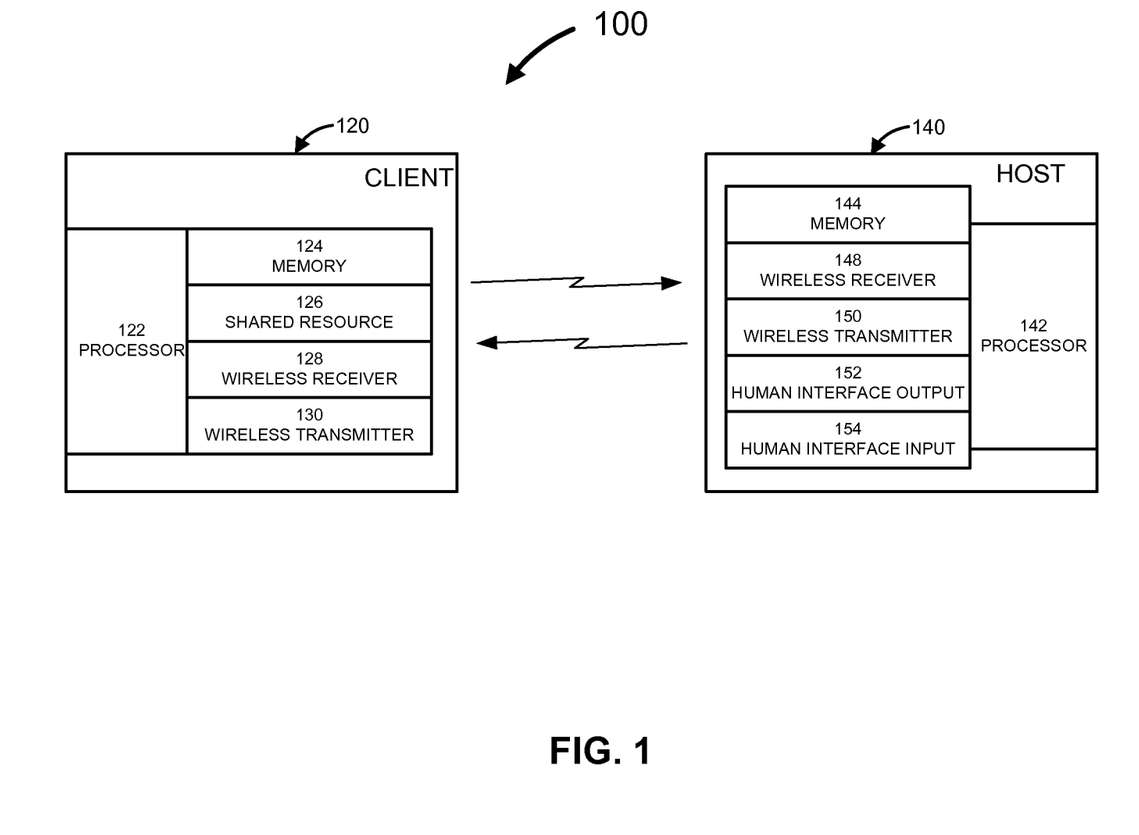
FIG. 1 illustrates selected components of a wireless network, including a host and a client.

FIG. 1 illustrates selected components of a client 120 and a host 140 in a one-to-one association within a wireless network 100. The client 120 includes a processor 122, a memory 124, a shared resource 126 that is capable of providing one or more services to the host 140 and to one or more other hosts one at a time, a receiver 128 for receiving communications from devices of the wireless network 100, and a transmitter 130 for sending communications to the devices of the wireless network 100. The memory 124, the shared resource 126, the receiver 128, and the transmitter 130 are coupled to the processor 122, which can configure, read, and/or write to these devices.

The host 140 similarly includes a processor 142, a memory 144, a receiver 148 for receiving communications from devices of the wireless network 100, and a transmitter 150 for sending communications to the devices of the wireless network 100. The host 140 also has a human interface output block 152, and a human interface input block 154. The memory 144, the receiver 148, the transmitter 150, the human interface output block 152, and the human interface input block 154 are coupled to the processor 142, which can configure, read, and/or write to these devices.

Each of the processors 122 and 142 may include, for example, one or more controllers, one or more microprocessors, one or more digital signal processors, one or more state machines, or a combination of such devices. Each of the memories 124 and 144 may be internal or external to the corresponding processor (122 or 142), and may include random access memory (RAM), read-only memory (ROM), programmable ROM (PROM), erasable PROM (EPROM), electrically erasable EPROM (EEPROM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), magnetic storage, and/or other memory devices.

In some variants, the communications within the wireless network 100 may span up to ten meters, up to thirty meters, up to one hundred meters, or up to three hundred meters. The communications may be conducted in conformity with the WiMedia standard, the ECMA-368/369 standards, the Bluetooth standard, the IrDA standard, the UWB standard, the ZigBee standard, or one of the IEEE 802.11 standards. (This list is not exclusive.) Accordingly, the receivers 128/148 and the transmitters 130/150 are configured to operate under the applicable standard or standards.

The shared resource 126 may be, for example, a display, such as a projector, a television display, or a computer display. In some variants, the shared resource 126 includes a display device with Mobile Display Digital Interface (MDDI) capabilities. The shared resource 126 may be sound reproduction equipment, such as one or more speakers. It may also be a storage device configured to store and/or provide data. It may be a gateway to another network, such as a wireless or wired network; the other network may be or may connect to the Internet or a telephone network. The shared resource 126 may also be electronic gaming equipment, with the host 140 performing the function of a game controller when an active association between the host 140 and the client 120 is in existence. The shared resource 126 may also be a personal or other computer with preloaded software, allowing the host 140 essentially to perform user input and output functions for the computer using the preloaded software. The shared resource may also be a human interface input, such as a keyboard or a pointing device (mouse, trackball, and similar devices). Still further, the shared resource may include mechanical and optical devices.

The human interface input block 154 may be, for example, a keyboard, a touchpad, and/or a pointing device. The human interface output block 152 may be, for example, a display device, a speaker, and/or a headset. The human interface input and out blocks may also be combined, for example, in a touchscreen.

An association between the client 120 and the host 140 may be established in a variety of ways. A passive association, for example, may be established automatically when the two devices are within communication range (of the wireless network) of each other. The responsibility for automatic discovery of the other device or devices may lie with either the client 120, the host 140, or with each of these devices simultaneously. An active association may be established as a result of a request generated by the user of the host 140, for example, following establishment of a passive association between the two devices.

Either the client 120, the host 140, or each of these devices may have additional elements, including receivers and/or transmitters designed to communicate with other wireless networks, or with networks other than wireless networks, including cellular networks. The cellular networks may operate, for example, under UTRAN or UMTS Terrestrial Radio Access Network standards, including code division multiple access (CDMA) and Global System for Mobile Communication (GSM) network standards.

Figure 2:
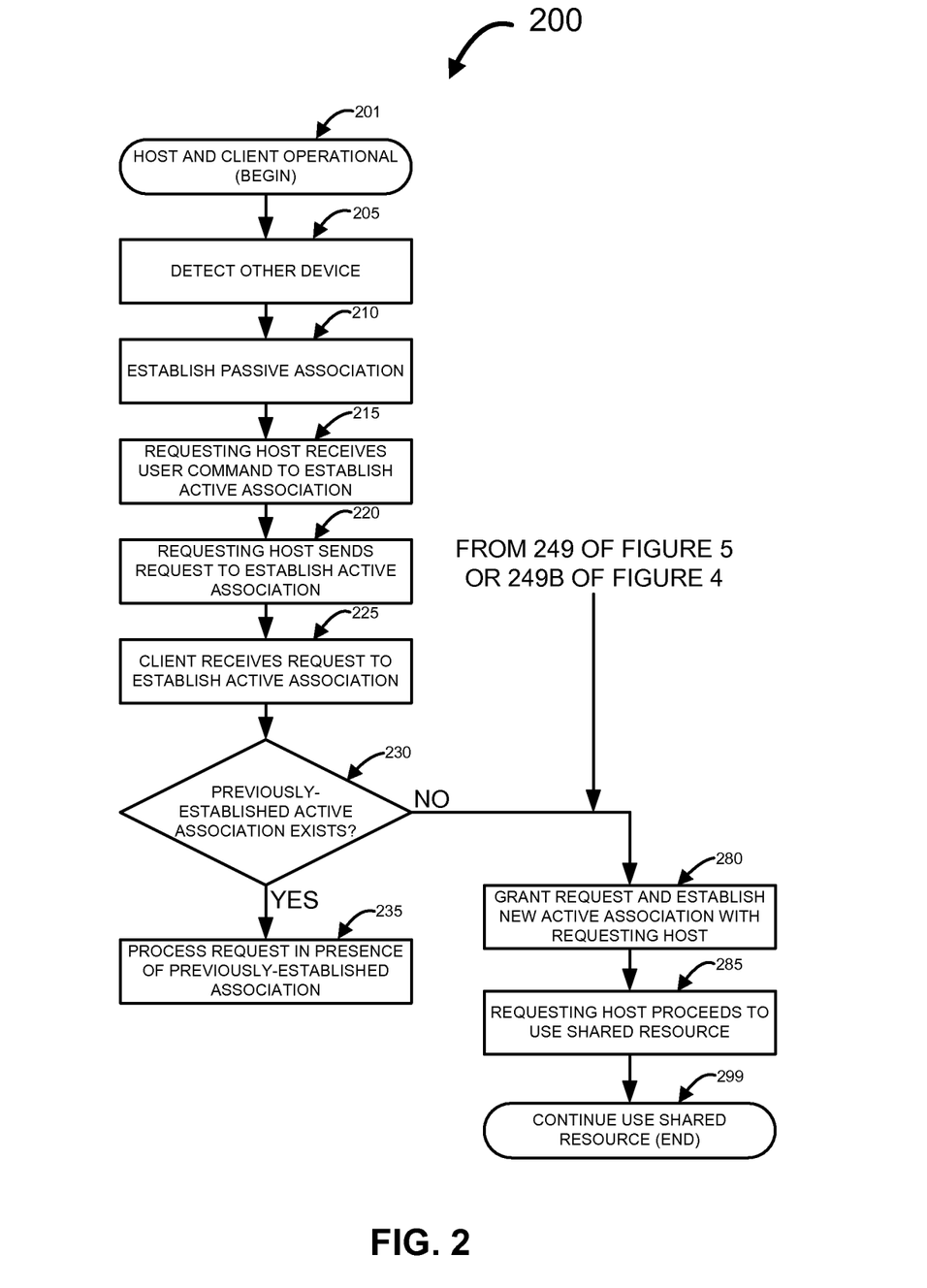
FIG. 2 illustrates selected steps and decision of a process for establishing a passive association and handling a request for an active association between a client and a host.

FIG. 2 illustrates selected steps of a process 200 for establishing first a passive and then an active association between a client, such as the client 120, and a requesting host, such as the host 140. In case a previously-established association between the client and another host exists, the other host may be identical, analogous, similar, or different from the requesting host.

At flow point 201, the host and the client are operational.

At step 205, at least one of the devices detects the other device within a distance that allows wireless network communications between them. The detecting device may be the client or the host.

At step 210, the client and the host negotiate or otherwise determine communication parameters for a passive association between them. The parameters may include medium access control (MAC) and physical layer (PHY) communication parameters. This step may be performed automatically in response to the detection of the step 205.

At step 215, the host receives a command from its user to establish an active association with the client for exclusive use of the shared resource of the client. The host may receive the command, for example, through the human interface input block of the host.

At step 220, the host sends a request to the client to establish an active association. The request may include introductory information, such as text, audio, video, or other information. The introductory information may identify the operator or owner of the host.

At step 225, the client receives the request.

At decision block 230, the client checks for existence of a previously-established active association with any other host. If such a previously-established active association is currently in existence, process flow branches to steps collectively designated with a reference numeral 235, where such situation may be handled as will be described further below.

If there is no previously-established active association currently in existence, process flow advances to step 280, in which the client grants the requesting host's request and additional parameters are negotiated or otherwise determined for the active association between the host and the client, and the association then becomes active. Previously-determined parameters applicable to communications between the client and the host (e.g., communication parameters determined in the step 210) may be kept, or they may be re-negotiated or otherwise changed.

The additional parameters may include, for example, quality of service (QoS) to be provided by the shared resource to the host. For a display, for example, resolution of the display may be such a parameter. For a connection to another network through the client, the parameters may include QoS of such connection (e.g., bandwidth and latency). A payment for the use of the shared resource may be transferred or authorized by the user as part of the step 280, and a visual or audio indication may signal the user of the availability of the resource. The visual or audio indication may be generated by the host (e.g., from the host's human interface output block), or by the client.

At step 285, the user of the host proceeds to use exclusively the shared resource of the client. The process then terminates at a flow point 299.

One category of active association may be a "solid" association that does not allow any other host to interrupt the association. In other words, the client does not entertain requests for active association in the presence of a previously-established active solid association. Returning to the decision block 230 of the process 200, existence of a previously-established solid association causes a rejection in the steps 235 of the association requested by the user. On the other hand, if the user manages to establish a solid association in the step 280, requests from other hosts for an active association will be rejected outright, without asking the user of the host with the current ownership of the active solid association whether the solid association may be released. The user with the solid association may or may not be notified of the request by another user.

Figure 3:
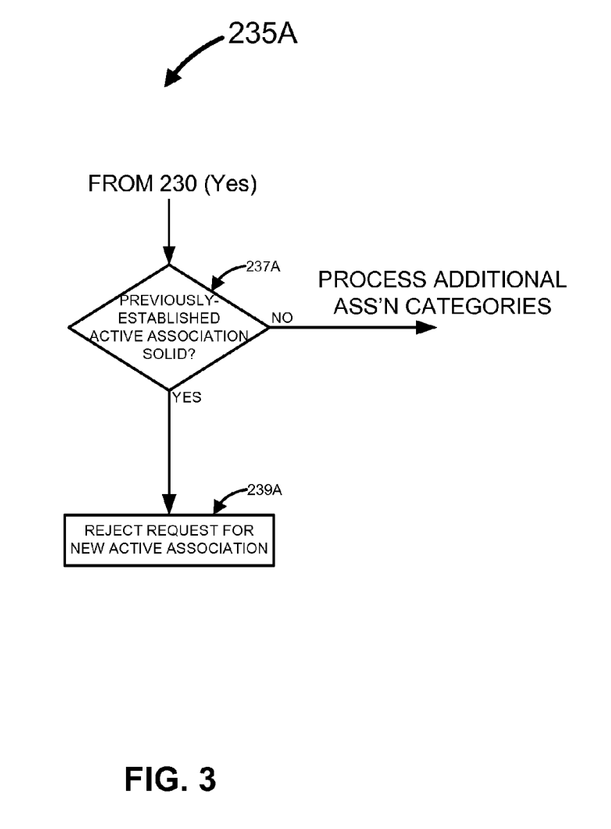
FIG. 3 illustrates details of selected steps and decisions of the process of FIG. 2 in the presence of a previously-established active solid association.

FIG. 3 illustrates selected steps 235A corresponding to the existence of a previously-established solid association. The process flow of the process 200 may proceed to the steps 235A where it is determined in the decision block 230 that a previously-established active association is currently in existence. The steps 235A may include a decision block 237A for checking whether the previously established association is a solid one, and a step 239A in which the client sends to the requesting host a message with an outright rejection of the request. If the request to establish an active association received in the step 225 included introductory information (text, video, or audio, for example), the steps 235A may include sending all or some of the introductory information to the host owning the previously-established active association. The host owning the previously-established active association may render (via display, indicator light, or sound, for example) to its user all or part of the introductory information, or some derivative of the introductory information. In this way, the user of the host owning the previously-established active association may become informed that another person is seeking the use of the shared resource.

Figure 4:
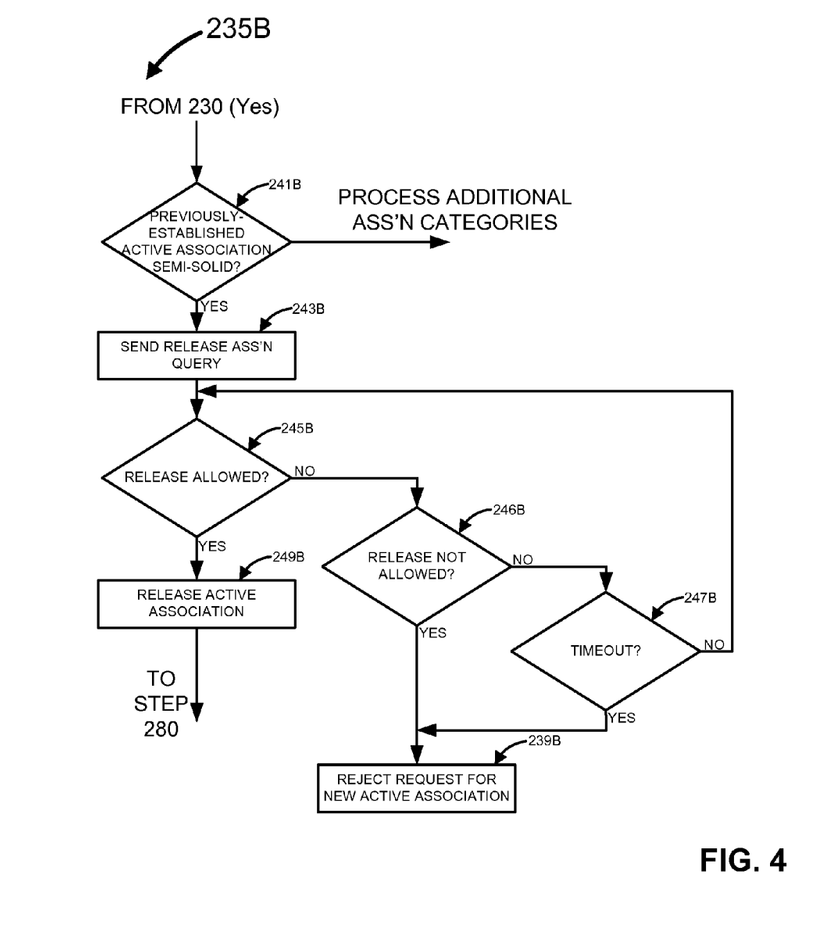
FIG. 4 illustrates details of selected steps and decisions of the process of FIG. 2 in the presence of a previously-established active semi-solid association.

Another category of association may be a "semi-solid" association that generates a request to the (first) host with the current active association to release the association for acquisition by the requesting (second) host. FIG. 4 illustrates selected steps 235B corresponding to this scenario. The process flow of the process 200 may proceed to the steps 235B after determining in the decision block 230 that a previously-established semi-solid active association is currently in existence. As shown in FIG. 4, the steps 235B corresponding to this scenario may include a decision block 241B for checking whether the previously-established active association is a semi-solid one, and a step 243B in which the client sends to the host owning the previously-established association a message (query) with a request to authorize release of the previously-established active association.

If the host owning the previously-established association grants the request prior to timeout, as determined in decision blocks 245B, 246B, and 247B, the previously established association is dropped or transformed into a passive association, at step 249B. Process flow then goes to the steps 280 and 285 (shown in FIG. 2) to establish a new active association between the client and the host requesting the active association, and the requesting host then uses the new association.

The request to authorize release may include information describing the association sought to be established, such as the category of the association (solid, semi-solid, or another category). If the request to establish an active association received in the step 225 included introductory information, the query may include all or some of the introductory information. The host owning the previously-established active association may render to its user the introductory information or some derivative of the introductory information.

The host granting or denying the request to release may be preprogrammed to grant or deny the request automatically without regard to other circumstances (e.g., always grant or always deny), it can request an authorization from its user via the human interface blocks (e.g., display "enter YES to grant the request and release the projector"), or it can do so automatically depending on some circumstances, such as the length of the period through which its user has not used the resource.

Still another category of association may be a soft or fragile association, whereby the client upon receipt of a request for an active association automatically releases the previously-established active association (or downgrades it to a passive association) and grants the newly-received request.

Associations may combine the properties of different association categories on a temporal basis. One example of such combined association is an active association that is solid for a predetermined period of time following its establishment, and then transitions to a fragile or a semi-solid association. The time period may be configurable by the user at a host when the association is requested.

Figure 5:
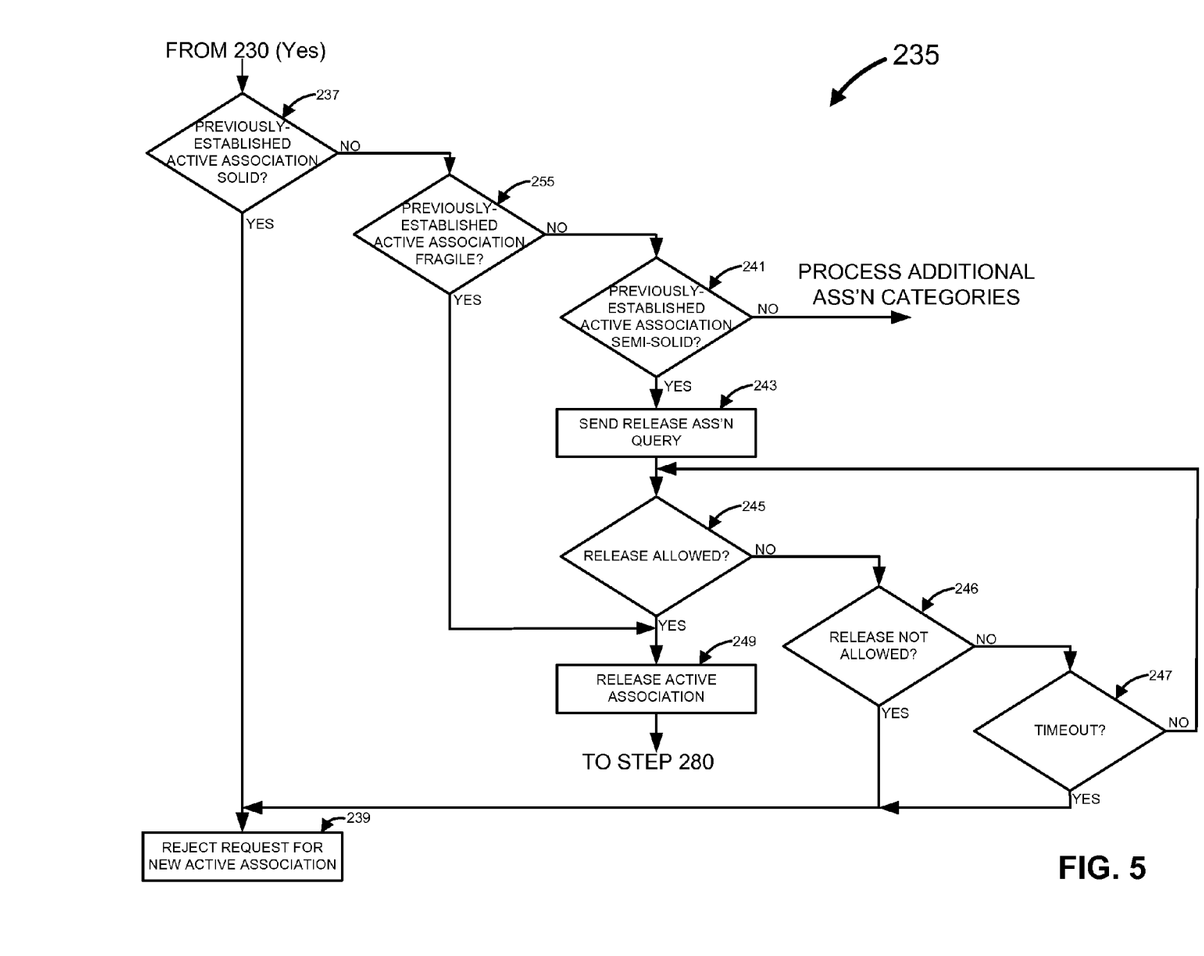
FIG. 5 illustrates details of selected steps of the process of FIG. 2 in the presence of a previously-established active association that may fall within different categories.

FIG. 5 illustrates selected steps 235 that incorporate processing of different categories of active associations, including solid active associations, semi-solid active associations, and fragile active association. Recall that the process 200 of FIG. 2 may proceed to the steps 235 when it determines in the decision block 230 that a previously-established active association is currently in existence.

In decision block 237, the client determines whether the previously-established active association is a solid active association, as is described above. If so, the client rejects in step 239 the request for an active association outright, that is, without querying the host that owns the previously-established association.

Otherwise, process flow proceeds to decision block 255. Here, the client determines whether the previously-established active association is a fragile active association, as is also described above. If the previously-established active association is a fragile one, that association is released in step 249. Releasing the association may free all or some of the resources dedicated to that association (the shared resource, computational resources, storage resources, and/or possibly other resources). The release may also transform that association into a passive one, by freeing the shared resource and possibly other resources, but keeping a communication link open to the host that owns that association.

From the step 249, process flow continues to the steps 280 and 285 (shown in FIG. 2), where a new active association is established with the requesting host, and the requesting host uses the new association.

Returning now to the decision block 255, if the determination made indicates that the previously-established association is not a fragile one, process flow proceeds to decision block 241 to determine whether the previously-established active association is a semi-solid association, as is also described above. If the previously-established association is not semi-solid, additional association categories are processed in a manner analogous to the processing of solid, fragile, and semi-solid association. If the association is a semi-solid one, the client advances to step 243 to send a query to the host that owns the previously-established association.

The query may cause a message to be generated at that host asking whether the association may be released. The request may include all or part of the introductory information, or information derived from the introductory information.

Note that if there are only these three categories of association (that is, solid, fragile, and semi-solid), the decision block 241 may not be needed, because the negative determinations made in the decision blocks 237 and 255 imply that the previously-established active association must be a semi-solid association.

From the step 243 the process flow proceeds to decision block 245 to determine whether the owner of the previously-established association authorized its release. If the owner authorized the release, the process flow advances to step 249, releasing the previously-established association. From the step 249, the process continues to the steps 280 and 285, establishing the requested association and allowing the requesting host to use the resource.

If, however, release has not yet been authorized as determined in the decision block 245, the client determines whether a negative response to the query has been received, in decision block 246. If the negative response has been received, the client proceeds to the step 239 to reject the request for the new active association.

If the host that owns the previously-established active association has not yet responded (either in the affirmative or in the negative), timeout condition is tested in decision block 247. The timeout condition may be an expiration of a timer defining the period of time from the query until a permission to release is received. If the timer expires, the timeout condition essentially indicates that permission to release the previously-established active association has been constructively denied. The client then proceeds to the step 239 to reject the request for the new active association. If timeout has not taken place, the client returns to the decision block 245, effectively looping until a response to the query is received or timeout takes place.

A different connection scheme resembles the semi-solid association, but with the request to release the previously-established association being transmitted directly from the requesting host to the host that owns the previously-established active association. Here, the previously-established association may be a solid one. When a new host requests an active association, the client rejects the request, indicating that an active association is in existence. The message with the rejection may contain sufficient information for the requesting host to contact the owner of the previously-established active association directly. Alternatively, the requesting host may identify over the wireless network one or all hosts within its communication distance (or identify these hosts by other means, such as a query through a different network, which may be a cellular network). Once the requesting host identifies the owner of the previously-established association, it sends a request to release the previously-established association directly to that host, either using the same wireless network or different means, such as the other network. The request may identify the requesting host. Alternatively, the requesting host may broadcast the request to release, multicast the request to release, or send multiple requests to release to different wireless network devices.

When the owner of the previously established association receives the request to release from the requesting host, it may allow its user to authorize or deny release of the association; it may also authorize, deny, or ignore the request automatically, for example, based on its configuration, preprogramming, or conditions (such as use or non-use of the previously-established association within a predetermined time period). If the host decides to release the association, it may send a release message directly to the client. In some variants, the release message is non-specific, that is, it does not identify the requesting host. In some variants, the release message specifies the requesting host. In the latter case, the client may attempt to establish an active association with the requesting host, or the client may provide a time window for the requesting host to re-request the active association. Requests from other hosts during this time window may be denied outright.

Although steps and decision blocks of various methods may have been described serially in this disclosure, some of these steps and decisions may be performed by separate elements in conjunction or in parallel, asynchronously or synchronously, in a pipelined manner, or otherwise. There is no particular requirement that the steps and decisions be performed in the same order in which this description lists them, except where explicitly so indicated, otherwise made clear from the context, or inherently required. It should be noted, however, that in selected variants the steps and decisions are performed in the particular sequences described above and/or shown in the accompanying Figures. Furthermore, not every illustrated step and decision may be required in every system in accordance with the invention, while some steps and decisions that have not been specifically illustrated may be desirable or necessary in some systems in accordance with the invention.

Those skilled in the art would understand that the concepts described in this document are applicable to various networks, including wireless local area networks, such as networks operating under the IEEE 802.11 standards, and wireless personal area networks.

Those of skill in the art would also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To show clearly this interchangeability of hardware and software, various illustrative components, blocks, modules, circuits, and steps may have been described above generally in terms of their functionality. Whether such functionality is implemented as hardware, software, or combination of hardware and software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm that may have been described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in an access terminal. Alternatively, the processor and the storage medium may reside as discrete components in an access terminal.

The previous description of the disclosed embodiments is provided to enable any person skilled in the art to make or use the present invention. Various modifications to these embodiments will be readily apparent to those skilled in the art, and the generic principles defined herein may be applied to other embodiments. Thus, the present invention is not intended to be limited to the embodiments shown herein, but is to be accorded the widest scope consistent with the principles and novel features disclosed herein.

What is claimed is:

1. A method for providing use of a shared resource of a client over a wireless network, the method comprising:
 establishing a passive association between the client and a first host of communications over the wireless network, the passive association not allowing use of the shared resource by the first host, wherein the shared resource is a resource residing at or available through the client;

receiving at the client a request from the first host to establish an active association between the first host and the client for communications over the wireless network, the active association allowing exclusive use of the shared resource by the first host;

in response to the request from the first host, determining at the client whether an active association allowing exclusive use of the shared resource by a second host exists;

if the step of determining whether an active association allowing exclusive use of the shared resource by the second host exists results in a determination that there is no active association with the second host, establishing the active association between the first host and the client for communications over the wireless network and allowing exclusive use of the shared resource by the first host;

if the step of determining whether an active association allowing exclusive use of the shared resource by the second host exists results in a determination that there is an active association with the second host, determining a category of the active association allowing exclusive use of the shared resource by the second host, the category is one of solid, semi-solid, and fragile; and determining whether to establish the active association between the first host and the client for communications over the wireless network based on the determined category of the active association.

2. The method of claim 1, wherein the wireless network is a wireless local area network (WLAN).

3. The method of claim 1, further comprising a step of detecting when the client and the first host are within the wireless network communication distance of each other, wherein the step of detecting is performed before the step of establishing the passive association.

4. The method of claim 1, further comprising a step of detecting when the client and the first host are within the wireless network communication distance of each other, wherein the step of establishing the passive association is performed automatically in response to the step of detecting.

5. The method of claim 1, wherein determining whether to establish the active association between the first host and the client based on the determined category of the active association comprises:

if the determined category is solid sending from the client to the first host a message over the wireless network rejecting the request from the first host.

6. The method of claim 1, wherein determining whether to establish the active association between the first host and the client based on the determined category of the active association comprises:

if the determined category is semi-solid sending from the client to the second host a message over the wireless network, the message comprising a query to authorize release of the active association between the second host and the client, determining whether the second host authorized release of the active association between the second host and the client, if the step of determining whether the second host authorized release results in a determination that the second host authorized release of the active association between the second host and the client, releasing the active association between the second host and the client, establishing an active association between the first host and the client over the wireless network, and allowing exclusive use of the shared resource by the first host, and if the step of determining whether the second host authorized release results in a determination that the second host denied to authorize release of the active association between the second host and the client, sending from the client to the first host a message over the wireless network rejecting the request from the first host.

7. The method of claim 6, wherein the request from the first host comprises introductory information, and the query comprises at least a part of the introductory information.

8. The method of claim 1, wherein determining whether to establish the active association between the first host and the client based on the determined category of the active association comprises:

if the determined category is semi-solid sending from the client to the second host a message over the wireless network, the message comprising a query to authorize release of the active association between the second host and the client, determining whether the second host authorized release of the active association between the second host and the client, if the step of determining whether the second host authorized release results in a determination that the second host authorized release of the active association between the second host and the client, releasing the active association between the second host and the client, establishing an active association between the first host and the client over the wireless network, and allowing exclusive use of the shared resource by the first host, and if the step of determining whether the second host authorized release does not results within a predetermined timeout period in a determination that the second host authorized release of the active association between the second host and the client, sending from the client to the first host a message over the wireless network rejecting the request from the first host.

9. The method of claim 1, wherein determining whether to establish the active association between the first host and the client based on the determined category of the active association comprises:

if the determined category is fragile, releasing the active association between the second host and the client, establishing an active association between the first host and the client over the wireless network, and allowing exclusive use of the shared resource by the first host, wherein the step of releasing is performed without requesting by the client from the second host an authorization to release.

10. The method of claim 1, wherein determining whether to establish the active association between the first host and the client based on the determined category of the active association comprises:

if the determined category is fragile, releasing the active association between the second host and the client, establishing an active association between the first host and the client over the wireless network, and allowing exclusive use of the shared resource by the first host;

if the determined category is solid, sending from the client to the first host a message over the wireless network rejecting the request from the first host;

if the determined category is semi-solid sending from the client to the second host a message over the wireless network, the message comprising a query to authorize release of the active association between the second host and the client, determining whether the second host authorized release of the active association between the second host and the client, if the step of determining whether the second host authorized release results in a determination that the second host authorized release of the active association between the second host and the client, releasing the active association between the second host and the client, establishing an active association between the first host and the client over the wireless network, and allowing exclusive use of the shared resource by the first host, and if the step of determining whether the second host authorized release results in a determination that the second host denied to authorize release of the active association between the second host and the client, sending from the client to the first host a message over the wireless network rejecting the request from the first host.

11. The method of claim 1, wherein the shared resource comprises a video display.

12. The method of claim 1, wherein the shared resource comprises a game terminal and the first host is configured as a game controller for the game terminal.

13. The method of claim 1, wherein the shared resource comprises a computational resource with software.

14. The method of claim 1, wherein the shared resource comprises a gateway to another network.

15. The method of claim 1, wherein the shared resource comprises a gateway to another wireless network.

16. The method of claim 1, wherein the shared resource comprises sound reproduction equipment.

17. The method of claim 1, wherein the first host comprises a personal digital assistant.

18. The method of claim 1, wherein the first host comprises a cellular telephone.

19. The method of claim 1, wherein the shared resource comprises a game terminal, the first host is configured as a first game controller for the game terminal, and the second host is configured as a second game controller for the game terminal.

20. The method of claim 1, wherein the wireless network is a wireless personal area network (WPAN).

21. A client device comprising:
a shared resource;
a memory;
a receiver of a wireless network;
a transmitter of the wireless network;
a controller coupled to the receiver, the transmitter, the shared resource, and the memory, the controller is configured to:
establishing a passive association between the client and a first host of communications over the wireless network, the passive association not allowing use of the shared resource by the first host, wherein the shared resource is a resource residing at or available through the client;
receiving at the client a request from the first host to establish an active association between the first host and the client for communications over the wireless network, the active association allowing exclusive use of the shared resource by the first host;
in response to the request from the first host, determining at the client whether an active association allowing exclusive use of the shared resource by a second host exists;
if an active association allowing exclusive use of the shared resource by the second host does not exist, establishing an active association between the first host and the client for communications over the wireless network and allowing exclusive use of the shared resource by the first host;

if an active association allowing exclusive use of the shared resource by the second host does exist, determining a category of the active association allowing exclusive use of the shared resource by the second host, the category is one of solid, semi-solid, and fragile; and determining whether to establish the active association between the first host and the client for communications over the wireless network based on the determined category of the active association.

22. The client device of claim 21, wherein the wireless network is a wireless local area network (WLAN).

23. The client device of claim 21, wherein the controller is further configured to detect when the client device and the first host are within the wireless network communication distance of each other before establishing the passive association.

24. The client device of claim 21, wherein the controller is further configured to detect when the client device and the first host are within the wireless network communication distance of each other, and to establish the passive association automatically in response to detecting the first host within the wireless network communication distance of the client device.

25. The client device of claim 21, wherein if the active association allowing exclusive use of the shared resource by the second host does exists, the controller is further configured to:
if the determined category is solid, send from the client to the first host a message over the wireless network rejecting the request from the first host.

26. The client device of claim 21, if an active association allowing exclusive use of the shared resource by the second host exists, the controller is further configured to:
if the determined category is semi-solid
send from the client to the second host a message over the wireless network, the message comprising a query to authorize release of the active association between the second host and the client,
determine whether the second host authorized release of the active association between the second host and the client,
if the second host authorized release of the active association between the second host and the client, release the active association between the second host and the client, establish an active association between the first host and the client over the wireless network, and allowing exclusive use of the shared resource by the first host, and
if the second host denied to authorize release of the active association between the second host and the client, send from the client to the first host a message over the wireless network rejecting the request from the first host.

27. The client device of claim 26, wherein the request from the first host includes introductory information and wherein the controller is further configured to include the introductory information in the query.

28. The client device of claim 21, wherein if an active association allowing exclusive use of the shared resource by the second host exists, the controller is further configured to:
if the determined category is semi-solid
send from the client to the second host a message over the wireless network, the message comprising a query to authorize release of the active association between the second host and the client, determine whether the second host authorized release of the active association between the second host and the client, if the second host authorized release of the active association between the second host and the client, release the active association between the second host and the client, establish an active association between the first host and the client over the wireless network, and allow exclusive use of the shared resource by the first host, and if the second host does not authorized release of the active association between the second host and the client, send from the client to the first host a message over the wireless network rejecting the request from the first host.

29. The client device of claim 21, if an active association allowing exclusive use of the shared resource by the second host exists, the controller is further configured to:

if the determined category is fragile,
release the active association between the second host and the client, establish an active association between the first host and the client over the wireless network, and allow exclusive use of the shared resource by the first host.

30. The client device of claim 21, if an active association allowing exclusive use of the shared resource by the second host exists, the controller is further configured to:

if the determined category is fragile, release the active association between the second host and the client, establish an active association between the first host and the client over the wireless network, and allow exclusive use of the shared resource by the first host;

if the determined category is solid, send from the client to the first host a message over the wireless network rejecting the request from the first host;

if the determined category is semi-solid
send from the client to the second host a message over the wireless network, the message comprising a query to authorize release of the active association between the second host and the client, determining whether the second host authorized release of the active association between the second host and the client, if the second host authorized release of the active association between the second host and the client, release the active association between the second host and the client, establish an active association between the first host and the client over the wireless network, and allow exclusive use of the shared resource by the first host, and if the second host denied to authorize release of the active association between the second host and the client, send from the client to the first host a message over the wireless network rejecting the request from the first host.

31. The client device of claim 21, wherein the shared resource comprises a video display.

32. The client device of claim 21, wherein the shared resource comprises a game terminal.

33. The client device of claim 21, wherein the shared resource comprises a computational resource with software.

34. The client device of claim 21, wherein the shared resource comprises a gateway to another network.

35. The client device of claim 21, wherein the shared resource comprises a gateway to another wireless network.

36. The client device of claim 21, wherein the shared resource comprises sound reproduction equipment.

37. The client device of claim 21, wherein the wireless network is a wireless personal area network (WPAN).

38. A non-transitory machine-readable medium comprising instructions, wherein when the instructions are executed by at least one processor of a client device comprising a shared resource and being configured to receive and transmit over a wireless network, the instruction cause the client device to perform steps comprising:

establishing a passive association between the client and a first host of communications over the wireless network, the passive association not allowing use of the shared resource by the first host, wherein the shared resource is a resource residing at or available through the client;

receiving at the client a request from the first host to establish an active association between the first host and the client for communications over the wireless network, the active association allowing exclusive use of the shared resource by the first host;

in response to the request from the first host, determining at the client whether an active association allowing exclusive use of the shared resource by a second host exists;

if the step of determining whether an active association allowing exclusive use of the shared resource by the second host exists results in a determination that there is no active association with the second host, establishing the active association between the first host and the client for communications over the wireless network and allowing exclusive use of the shared resource by the first host;

if the step of determining whether an active association allowing exclusive use of the shared resource by the second host exists results in a determination that there is an active association with the second host, determining a category of the active association allowing exclusive use of the shared resource by the second host, the category is one of solid, semi-solid, and fragile; and determining whether to establish the active association between the first host and the client for communications over the wireless network based on the determined category of the active association.

39. The machine-readable medium of claim 38, further comprising the step of:

detecting when the client device and the first host are within the wireless network communication distance of each other, wherein detecting is performed before the step of establishing the passive association.

40. The machine-readable medium of claim 38, further comprising the steps of:

detecting when the client device and the first host are within the wireless network communication distance of each other; and establishing the passive association is performed automatically in response to the step of detecting.

41. The machine-readable medium of claim 38, wherein determining whether to establish the active association between the first host and the client based on the determined category of the active association comprises:

if the determined category is solid, sending from the client to the first host a message over the wireless network rejecting the request from the first host.

42. The machine-readable medium of claim 38, wherein determining whether to establish the active association between the first host and the client based on the determined category of the active association comprises:

if the determined category is semi-solid
sending from the client to the second host a message over the wireless network, the message comprising a query to authorize release of the active association between the second host and the client, determining whether the second host authorized release of the active association between the second host and the client, if the step of determining whether the second host authorized release results in a determination that the second host authorized release of the active association between the second host and the client, releasing the active association between the second host and the client, establishing an active association between the first host and the client over the wireless network, and allowing exclusive use of the shared resource by the first host, and if the step of determining whether the second host authorized release results in a determination that the second host denied to authorize release of the active association between the second host and the client, sending from the client to the first host a message over the wireless network rejecting the request from the first host.

43. The machine-readable medium of claim 38, wherein determining whether to establish the active association between the first host and the client based on the determined category of the active association comprises:

if the determined category is semi-solid sending from the client to the second host a message over the wireless network, the message comprising a query to authorize release of the active association between the second host and the client, determining whether the second host authorized release of the active association between the second host and the client, if the step of determining whether the second host authorized release results in a determination that the second host authorized release of the active association between the second host and the client, releasing the active association between the second host and the client, establishing an active association between the first host and the client over the wireless network, and allowing exclusive use of the shared resource by the first host, and if the step of determining whether the second host authorized release does not results within a predetermined timeout period in a determination that the second host authorized release of the active association between the second host and the client, sending from the client to the first host a message over the wireless network rejecting the request from the first host.

44. The machine-readable medium of claim 38, wherein determining whether to establish the active association between the first host and the client based on the determined category of the active association comprises:

if the determined category is fragile, releasing the active association between the second host and the client, establishing an active association between the first host and the client over the wireless network, and allowing exclusive use of the shared resource by the first host, wherein the step of releasing is performed without requesting by the client from the second host an authorization to release.

45. The machine-readable medium of claim 38, wherein determining whether to establish the active association between the first host and the client based on the determined category of the active association comprises:

if the determined category is fragile, releasing the active association between the second host and the client, establishing an active association between the first host and the client over the wireless network, and allowing exclusive use of the shared resource by the first host;

if the determined category is solid, sending from the client to the first host a message over the wireless network rejecting the request from the first host;

if the determined category is semi-solid sending from the client to the second host a message over the wireless network, the message comprising a query to authorize release of the active association between the second host and the client, determining whether the second host authorized release of the active association between the second host and the client, if the step of determining whether the second host authorized release results in a determination that the second host authorized release of the active association between the second host and the client, releasing the active association between the second host and the client, establishing an active association between the first host and the client over the wireless network, and allowing exclusive use of the shared resource by the first host, and if the step of determining whether the second host authorized release results in a determination that the second host denied to authorize release of the active association between the second host and the client, sending from the client to the first host a message over the wireless network rejecting the request from the first host.

46. A client device comprising:

a shared resource means;

a means for storing data;

a means for receiving information over a wireless network;

a means for transmitting information over the wireless network;

a controller means for controlling the shared resource means, the means for storing data, the means for receiving information, and the means for transmitting information, wherein the controller means is configured to:

establishing a passive association between the client and a first host of communications over the wireless network, the passive association not allowing use of the shared resource by the first host, wherein the shared resource is a resource residing at or available through the client;

receiving at the client a request from the first host to establish an active association between the first host and the client for communications over the wireless network, the active association allowing exclusive use of the shared resource by the first host;

in response to the request from the first host, determining at the client whether an active association allowing exclusive use of the shared resource by a second host exists;

if an active association allowing exclusive use of the shared resource by the second host does not exist, establishing an active association between the first host and the client for communications over the wireless network and allowing exclusive use of the shared resource by the first host;

if an active association allowing exclusive use of the shared resource by the second host does exist, determining a category of the active association allowing exclusive use of the shared resource by the second host, the category is one of solid, semi-solid, and fragile; and determining whether to establish the active association between the first host and the client for communications over the wireless network based on the determined category of the active association.

* * * * *